United States Patent
Arsenault et al.

(10) Patent No.: US 8,429,219 B2
(45) Date of Patent: Apr. 23, 2013

(54) DATA ALTERATION PREVENTION SYSTEM

(75) Inventors: David Arsenault, Reston, VA (US); Arun Sood, Clifton, VA (US); Yih Huang, Fairfax, VA (US)

(73) Assignee: George Mason Research Foundation, Inc., Fairfax, VA (US)

( * ) Notice: Subject to any disclaimer, the term of this patent is extended or adjusted under 35 U.S.C. 154(b) by 969 days.

(21) Appl. No.: 11/419,832

(22) Filed: May 23, 2006

(65) Prior Publication Data

US 2006/0277321 A1    Dec. 7, 2006

Related U.S. Application Data

(60) Provisional application No. 60/683,303, filed on May 23, 2005.

(51) Int. Cl.
*G06F 15/16* (2006.01)
*G06F 9/00* (2006.01)

(52) U.S. Cl.
USPC .............................................. 709/202; 713/2

(58) Field of Classification Search ............. 709/223, 709/244, 202, 222; 713/240, 1–2; 726/26
See application file for complete search history.

(56) References Cited

U.S. PATENT DOCUMENTS

| | | | |
|---|---|---|---|
| 6,513,071 B2 * | 1/2003 | Madl et al. | 719/313 |
| 6,564,317 B1 * | 5/2003 | Hale et al. | 713/1 |
| 7,024,551 B2 * | 4/2006 | King et al. | 713/2 |
| 7,386,713 B2 * | 6/2008 | Madter et al. | 713/2 |
| 7,500,021 B2 * | 3/2009 | Takahashi | 710/5 |
| 2005/0257041 A1 * | 11/2005 | Wallenstein et al. | 713/2 |
| 2005/0268084 A1 * | 12/2005 | Adams et al. | 713/2 |

* cited by examiner

*Primary Examiner* — Chirag R Patel
(74) *Attorney, Agent, or Firm* — David Grossman; David Yee

(57) ABSTRACT

A method, system and computer program product for controlling a processing unit connected to a network. The method includes providing information to the network by the processing unit via plural communication channels; sending a reset signal from a controller to a reset unit of the processing unit after a specified amount of time, the reset unit being connected only to a communication channel of the controller and being isolated from the plural communication channels; and rebooting the processor unit when the reset signal is received by the reset unit.

12 Claims, 8 Drawing Sheets

| Security Feature | Description |
| --- | --- |
| (1) Periodic Reset and Cleansing | Online SCIT servers are periodically rebooted and go through audit, integrity checking, and self-cleansing processes at startup. |
| (2) Protected Files Loaded From Trusted Storage Source | After resetting SCIT servers, load files (operating system, data, and application files) from a known clean source, such as a read-only device or the Trusted Storage machine. |
| (3) Role Assumption | After the cleansing process completes (1) and the protectee files are loaded (2), the server is begins its service role in a known state. |
| (4) Security Operations Executed Only in Clean State | After the self-cleansing process is complete but before the SCIT server is placed in an online service state, security operations or updates are conducted in this offline and clean state. |
| (5) Isolation of Online Servers (from the internal networks and trusted storage) | The isolation of SCIT servers is preferably guaranteed when they are in the online state and connected to the external network. In a SCIT cluster, isolation means there must be no possible way for a connection to be established between SCIT servers and Trusted Storage machine(s) or SCIT servers and the SCIT Controller (in the case of a centrally-controlled architecture). |
| (6) Isolation of the Secure Controller | The Secure Controller computer that manages the SCIT cluster is free from attacks via the network because it is fully and completely isolated from all public network connections. |

FIG. 8

DATA ALTERATION PREVENTION SYSTEM

CROSS REFERENCE TO RELATED APPLICATIONS

This application claims the benefit of U.S. Provisional Application No. 60/683,303, to Huang et al., filed May 23, 2005, and entitled "Toward Provable System Security," the entire contents of which are incorporated herein by reference.

STATEMENT REGARDING FEDERALLY FUNDED SPONSORED RESEARCH OR DEVELOPMENT.

The U.S. Government has a paid-up license in this invention and the right in limited circumstances to require the patent owner to license others on reasonable terms as provided for by the terms of Grant No. 60NANB2D0108, awarded by the National Institute of Standards and Technology.

BRIEF DESCRIPTION OF THE DRAWINGS

FIG. 8 is a table listing desirable security features of the SCIT system according to an embodiment of the present invention.

DETAILED DESCRIPTION OF EMBODIMENTS

Computers and networks are vulnerable to attacks despite research on computer and network security and the availability of many commercial security products. Computer systems are besieged by a myriad of security threats as viruses, worms, malware, denial of service attacks, data thefts, and software vulnerabilities. Thus, according to an embodiment of the present invention, a network (SCIT) relies on a hardware component to ensure the rebooting of a server of the network instead of software associated with the network.

Figure 1:
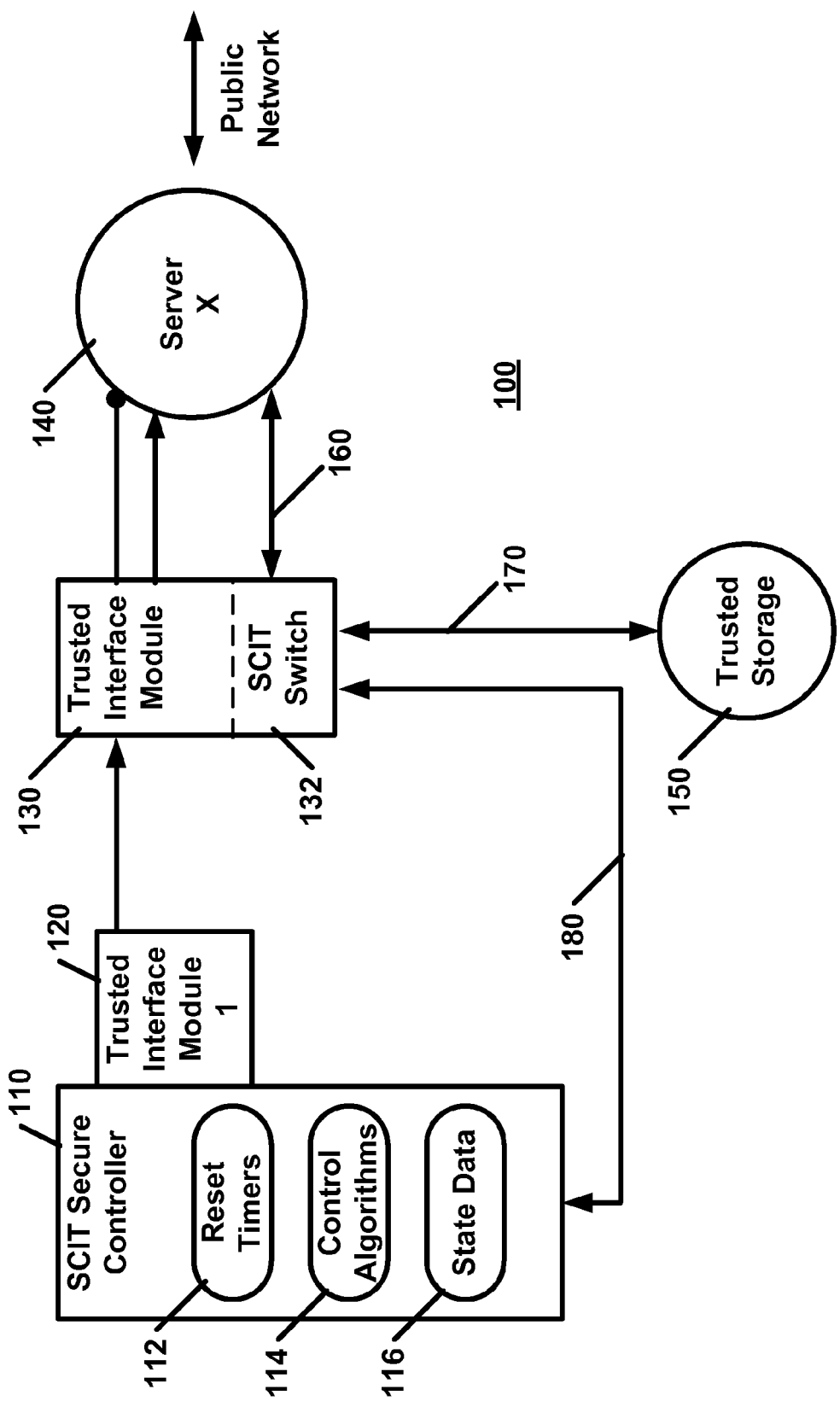
FIG. 1 shows a schematic diagram of a Self-Cleaning Intrusion Tolerance (SCIT) system that has one server according to an embodiment of the present invention.

FIG. 1 shows a block diagram of a SCIT system 100. The SCIT system 100 includes at least a SCIT controller 110 and a server 140. The SCIT controller 110 may include reset timers 112, a control algorithm unit 114, and a state data unit 116. The SCIT controller 110 may be implemented as a dedicated microprocessor system or as software code. The SCIT controller 110 may be connected to a first Trusted Interface Module (TIM) 120. The TIM may be a dedicated hardware component, a logic circuit, or any circuit that is specifically designed to allow only one way flow of information. Optionally, a second TIM 130 may be located within the server 140. Alternatively, the second TIM 130 may be located outside the server 140.

The first and second TIMs 120 and 130 can create a unidirectional communication path between the controller 110 and a SCIT switch 132. The switch 132 may be positioned at the server 140 or remote from the server 140. The switch 132 may directly interact with the server 140 through a bidirectional communication channel 160 and with a trusted storage unit 150 through a bidirectional communication channel 170. In addition, the switch 132 may communicate through a bidirectional communication channel 180 with the controller 110. A more detailed description of SCIT system 100 embodiments is provided below when FIGS. 2 and 3 are discussed.

In one embodiment, the SCIT system may have a software component for facilitating the control of the server 140. However, the software may be corrupted by an intruder via communications channels linking the SCIT system via the server 140 to a commercial site. Also, an online system such as the server 140 may be compromised because intruders may attack the server 140 and alter its content. Thus, the SCIT system attempts to provide a layer of automated defenses that may thwart known and unknown system attacks.

In an embodiment, the SCIT system may have Hardware Enforced Security (SCIT/HES) to remove the vulnerabilities depending on software. For example, the SCIT controllers may be connected to a plurality of servers and the SCIT server may be used for managing server role rotations and cleansing of the online servers. Thus, the HES components may be placed between the SCIT controller 110 and the server 140 to prevent an intruder reaching the SCIT controller 110 via the server 140.

Figure 2:
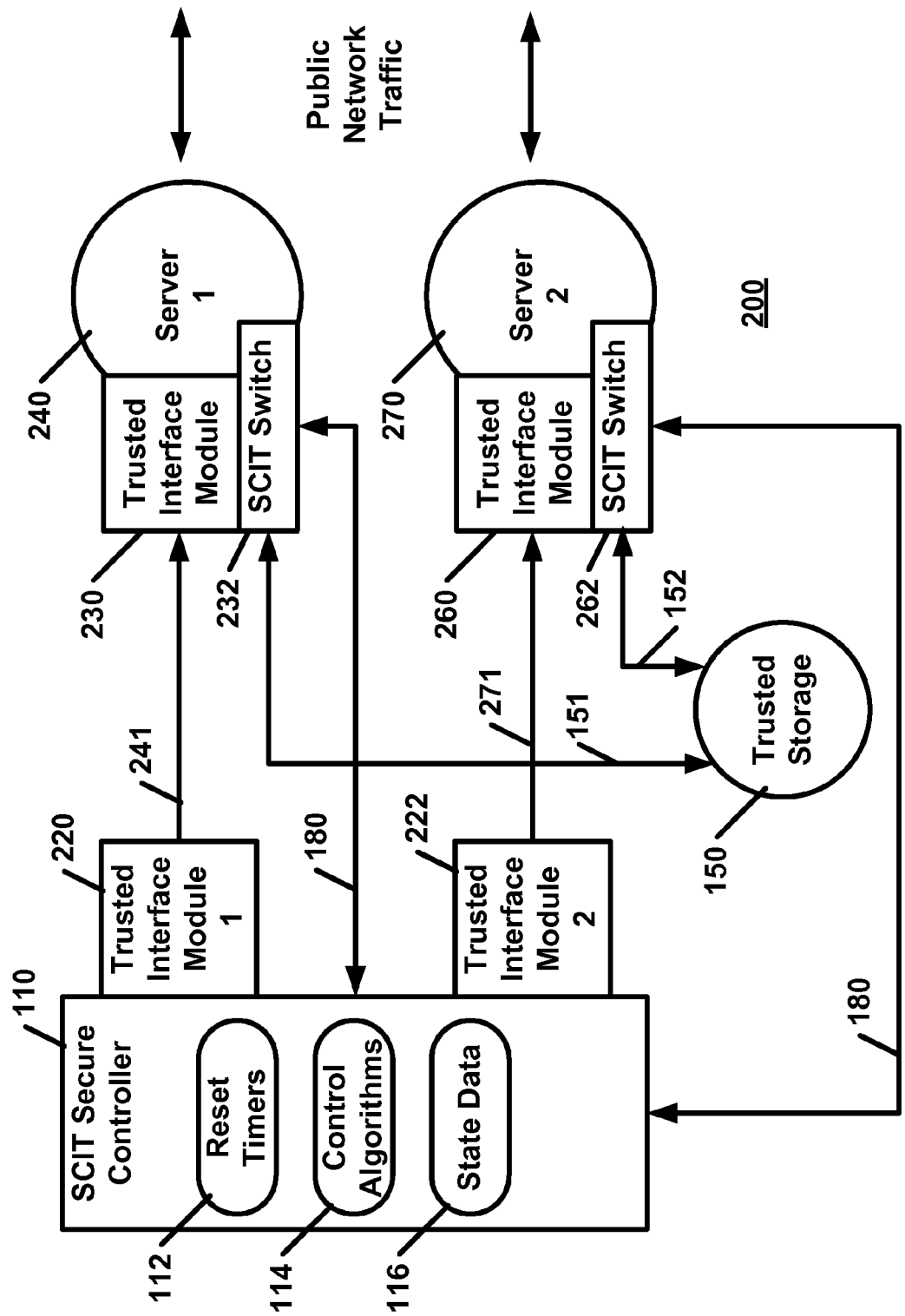
FIG. 2 shows a schematic diagram of a SCIT system with two servers according to an embodiment of the present invention.
Figure 3:
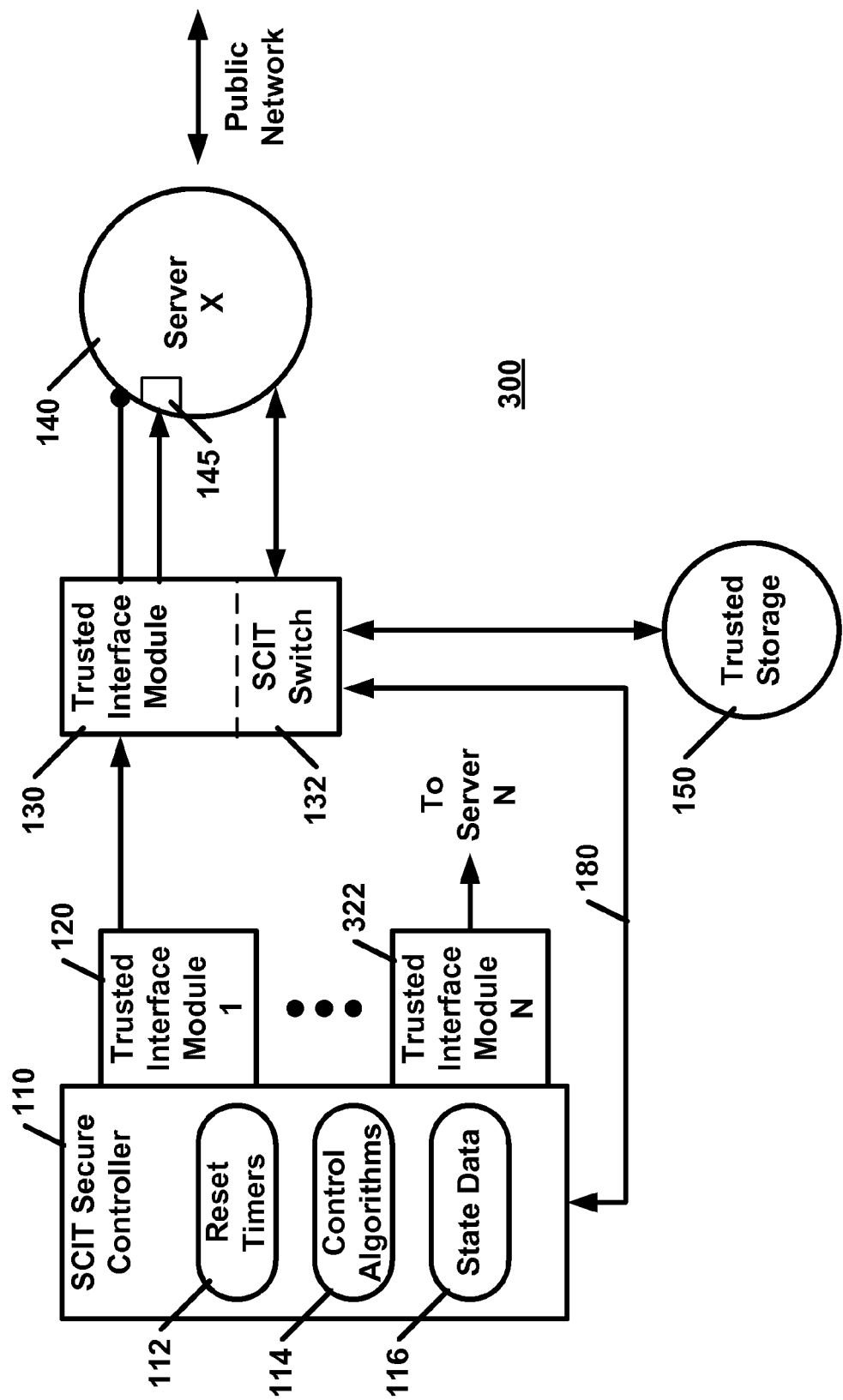
FIG. 3 shows a schematic diagram of a SCIT system with N servers according to an embodiment of the present invention.

FIG. 2 is a schematic diagram of a SCIT system with two servers 240 and 270. According to one embodiment of the present invention, a cluster architecture of the plurality of servers of the SCIT system 100, as shown in FIG. 2, should allow individual servers to occupy different functional roles without affecting the availability of a service that a server is performing. The SCIT system may use this ability to shift server roles to perform role rotations on each server where one of the roles is a self-cleansing process. A lifecycle of an individual server may begin with the cleansing role and then progress through one or more online service roles. Repeating this lifecycle should ensure that each server is not online for an indefinite amount of time and that it is periodically cleaned. By limiting the length of time the server is online, the SCIT system should reduce the window of opportunity for an intruder seeking to exploit known or unknown vulnerabilities of the system. Further, by periodically cleaning each server in the network (cluster), an attacker's opportunity to establish a foothold within the network for further or future attacks may be severely restricted.

The cleaning process for each of the servers 240 and 270 may be performed offline at the start of the server's lifecycle. Periodic cleansing is generally mandatory regardless of the presence or lack of intrusion alarms. However, in an embodiment of the present invention the periodic cleansing is not mandatory but is based on the presence or lack of intrusion alarms. The cleansing task may include features such as an audit process (analysis of a transaction history of the server captured in a log file), file integrity checking, and automated recovery if corruption is detected. In addition to auditing and integrity checking, each server 240 and 270 may be configured to load all or part of the operating system, configuration, application, and data files from the trusted storage source 150 upon startup. The trusted storage 150 may be a read-only source such as a CD-ROM, a ROM memory, or an equivalent medium or a cryptographically signed data storage that may be verified as absolutely unmodified. Once a server is cleaned, the server may be placed into an online service role to perform its intended function. Security benefits of the SCIT system discussed above may include the features listed in FIG. 8, which are explained in more detail below.

According to another embodiment of the present invention, the SCIT system may be implemented as a distributed protocol to manage the state of the cluster and control the role rotations of the servers belonging to the cluster. One protocol that may be used by the SCIT system for this embodiment is a Cluster Coordination Protocol (CCP). Other protocols known in the art may be used in the SCIT system.

The communication mechanism that enables distributed control of the cluster may depend on a secure communication between machines in the cluster. Control messages may be transported via TCP packets, for example, using a port knocking technique. Other packets are also possible. Port knocking involves closing a range of ports to prevent connections from being established, then sending connection attempts to these ports which are rejected but logged by the firewall on each machine. The log entries may form the basis of the control messages and allow for intra-server communications without the need for creating potentially exploitable connections (using open ports) between the machines in the cluster. A software program such as a SCIT controller daemon may run on each server to process the CCP message exchanges. Other software programs that perform the same (or similar) function as the SCIT controller daemon may be used.

According to another embodiment, the SCIT system may use multiple servers in a clustered arrangement to provide services to users, as for example web content serving and DNS name resolutions. Thus, the SCIT system may be implemented, for example, as a web server cluster and/or a DNS server cluster. The web server cluster may have two service roles: a primary web server and a backup server. The DNS cluster may also have two service roles: a primary DNS service role and a secondary DNS service role. Both servers may implement the SCIT CCP or equivalent protocols to effect role rotations. An enhanced, secure version of the CCP protocol is the CCP/Secure protocol, or CCP/S, which utilizes a digital signature and cryptographic techniques to eliminate the possibility of both replay and spoofing attacks that target CCP messages themselves. In the case of the DNS cluster, if SCIT features listed in FIG. 8 are implemented, then the private keys should not be exposed and the DNS updates may be performed and signed by a clean server, even in the presence of successful but undetected cyber attacks.

Another embodiment of the present invention, shown in FIG. 2 shows the controller 110 connected to a first server 240 and a second server 270. Each server may have the structure described in FIG. 1 with respect to server 140 or may have a different structure. For example, any of the servers of FIGS. 1 and 2 may be a computer system, a microprocessor, or a software component. The controller 110 can have different communication channels 241 and 271 for each of the servers 240 and 270, and the trusted storage unit 150 can have dedicated communication channels 151 and 152 with each server. The communication channels 241, 151, 152, and 271 may be implemented by using a cable. The controller 110 may have TIMs 220 and 222 for each server, and each server may have its own TIM, for example 230 and 260.

The architecture shown in FIG. 2 is for a SCIT/HES cluster system. This two-server secure cluster illustrates a SCIT/HES cluster that could be used for practical applications, such as web serving, DNS, e-mail, directory servers, and the like.

As shown, the controller at the center of the system is connected to two TIM units. At the other end of the TIM connections are the cluster's two server machines (hosts) which exist to provide one or more services to customers. As the hosts are exposed to the public or enterprise network, they may also be exposed to the risks within these networks and thus must remain isolated from the Secure Controller or otherwise the SCIT security features would be violated. In other words, the connection of the servers 240 and 270 to public networks may make the servers vulnerable to outside attacks. One role of the TIM units is to enforce the physically isolation of the servers from each other as well as from the SCIT controller itself. Some details of how this may be accomplished are discussed with regard to FIG. 3.

The SCIT system described in the figures addresses system security vulnerabilities of both known and unknown natures. However, the SCIT system itself may depend on the SCIT software running on the servers for correct and uninterrupted operations. The SCIT software itself may compromise, for example, one or more of the SCIT security features listed in FIG. 8. Thus, using hardware components for implementing the TIMs and a novel cluster architecture to enforce the SCIT features of FIG. 8 may achieve prevention of data alteration, even when the SCIT software processes themselves are compromised.

The SCIT system described in the figures may remove the vulnerabilities depending on software for managing server role rotations and thus cleansing of the servers. According to one embodiment of the present invention, the distributed CCP algorithm may be centralized and moved to a SCIT central controller server. Building on this central control mechanism, communication links may be maintained from the controller to each of the servers in the cluster. A set of hardware mechanisms (non-programmable logic circuits, for example the TIMs) in the communication interfaces permits the use of standard server hardware while providing security upon which the ultimate security of the system depends.

FIG. 3 illustrates the architecture of the SCIT system 300 having the SCIT controller 110 and a plurality of N servers. For clarity of the illustration, only server 140 is shown in FIG. 3. The controller 110 may be a programmable machine (server or processor or any electronic programmable device) that implements control algorithms configured to govern the cluster's operation including server role rotations. Controlling the cluster using a programmable controller affords cluster designers flexibility and robustness for the fully-distributed architecture. A central mechanism of control as the controller 110 may simplify both administration and programming of the cluster, which allows the cluster designer to modify, tune, and optimize the role rotation algorithms needed for a particular application. Timing of both role rotations and reset timers may be programmable.

The TIMs 120 and 130 are isolating mechanisms that maintain the protected state of the controller 110 and at the same time allow the controller to send messages to control the state of each server. The unidirectional link between the controller 110 and each server 140 is implemented by hardware. Using the TIMs 120 and 130, the controller 110 may manage the communications interface (network links) between a clean machine (any server 140 that has been cleansed but not yet online), the trusted storage unit 150, and the controller 110 itself.

Switch 132 provides hardware isolation between each server and the trusted storage unit 150 and between the controller 110 and the server 140. When switch 132 is closed, switch 132 enables the network connection between the server 140 and the other machines it connects to, but, when switch 132 is set to the open position, no network connection between the server 140 and public networks or other unsecured networks should exist.

FIG. 3 illustrates one possibility of how the hardware components may be architected. The security features that were listed in FIG. 8 may depend on the hardware components used in the SCIT system 300. To understand how the features listed in FIG. 8 may be implemented in the SCIT system 300, the role of each component of the SCIT system 300 is discussed next.

As discussed above, the SCIT system 300 has controller 110 which manages a set of TIMs, 120 to 322. The TIMs provide connections to each server in the cluster. The controller 110 may be a programmable machine (server) that implements the control algorithms that govern the cluster's operation, including serve role rotations. Supporting this control function are reset timers 112 (one per interface) and a mechanism to store state data 116 from each server. The TIM units may provide a unidirectional communications link from the controller 110 to each server 140 in the cluster. At the server end of the TIM unit, the unit may connect to the server's serial port for power, ground, and data. A connection to the server's reset switch 145 may also be used to provide the failsafe reset function. The data sent from the controller 110 to the server 140 over this connection may inform the server 140 when a state change is needed (such as beginning the cleansing process). The server-side TIM unit 130 may include a switch component that provides the ability to cut-off the network connections from the server 140 to the local network (which includes the SCIT controller itself as well as the trusted storage server 150).

The centrally-controlled SCIT/HES cluster, using the secure controller 110 and a set of TIM units (for example one per server), may provide a secure environment from which to run applications on public or enterprise networks. As will be discussed next, the SCIT/HES system 300 should be capable of implementing features listed in FIG. 8.

The first security feature listed in FIG. 8 is the guarantee that servers go through the periodic self-cleansing process. Resetting the server system should force the server to reboot, go through the cleaning process, and finally load known clean copies of necessary files from the trusted storage. There are at least two ways to accomplish the server reset. According to one embodiment of the present invention, the TIM unit can signal the server to reset and the server begins the cleaning process. According to this embodiment, there exists a dependency on a piece of software that listens for and executes commands given over the interface to the server.

According to another embodiment of the present invention, the dependency of the server on the piece of software discussed in the previous embodiment may be removed by using a hardware mechanism to force the server reset under non-optimal conditions such as an attack. The hardware failsafe reset switch 145 may involve a timer process running on the SCIT controller that counts down for a specified amount of time and then closes the reset switch 145 of the server 140 to which it may be connected through the TIM unit 130. The reset switch 145 should communicate (exchange data) only with TIM unit 130 and should not be capable of being programmed through the public network. In other words, the reset switch 145 of the server 140 should be constructed to be programmed or affected by an intruder that has achieved software access to the server 140. This feature of the reset switch 145 should guarantee that the server 140 will always reset and be cleaned when instructed by the controller 110.

The second security feature listed in FIG. 8 involves loaded files necessary to the successful operation of the server 140 from a trusted storage device 150, which may be a read-only device such as a CD-ROM or a cryptographically secured server. The trusted storage device 150 might be any storage device known by one skilled in the art. The access to the trusted storage device 150 and the links between the controller 110, the server 140, and the trusted storage device 150 are all controlled by the SCIT controller 110 through the SCIT switch 132. This feature is intended to enforce the security of the SCIT system 300, because the online servers should have no access to the intranet and sensitive information stored on the controller 110 or the trusted storage system 150.

The third security feature listed in FIG. 8 accomplishes the initial service role assumption of a server transitioning from the ready (clean) state to the assigned online service role. The basis for this feature may be the fact that a newly clean server has not been exposed to the outside world (external network) and may be thus free from any corruption. Since the SCIT daemon and other system software has been loaded from a known clean copy, the server, when commanded by the controller, should transition into its intended service role as expected.

The fourth security feature listed in FIG. 8 involves processing security-critical operations only during the clean state, before the server goes online and may be exposed to the external network. Like the second security feature, this fourth feature may be enforced by using SCIT switches to manage the access to the trusted storage device, which holds security keys and other data. Before moving the server online, the controller may turn off the SCIT switch of the server to sever its access to the keys. As an added feature, these keys will not be exposed to the public Internet.

The fifth security feature listed in FIG. 8 is related to the SCIT controller 110 being capable of being fully isolated from the servers 140 that are online, performing their production roles. To enforce this security feature, a hardware switch, a "once after reset" switch, may be implemented using a logic circuit. This switch, which corresponds to switch 132 in FIGS. 1-3, may be installed on all interfaces that connect the controller 110 to the servers 140 in the cluster and regulates the direction of data flow through the interfaces. The "once after reset" switch 132 may operate between two and only two states: one state allows bidirectional data flow between the controller 110 and the server 140 while the other state allows only unidirectional data flow from the controller 110 to the server 140.

The controller 110 operates the switch 132 via hardware-based signaling. The SCIT switch 132 powers up in the closed state, which allows the server 140 to connect to the trusted storage device 150 as it goes through the cleaning process. At this time, the server 140 may also communicate with the controller 110 via the intranet connection 180 to exchange any state data (if required by the applications being run in the cluster). Once the server 140 is clean and ready to perform an online role, the SCIT switch 132 is set to the closed position which prevents any communications on the network interface regardless of what state the network interface card is set to on the server. An attacker cannot turn the interface on and gain a network link outside the server into the rest of the cluster. Once the state of the switch is changed by the controller, the only way to restore the state to enable communications on the link is a server reset which cycles the power to the switch. This is the "once after reset" property that ensures server isolation.

The sixth security feature listed in FIG. 8 is related to the capability of the controller 110 to remain fully and completely isolated from the rest of the SCIT system 300. The isolation of the controller 110 may be accomplished in one embodiment by using a one-way optical link in the TIM units. Such a link provides logical isolation of the controller 110 from the servers 140. Alternative one-way links maybe be used as will be appreciated by one of ordinary skill in the art. As such, the controller 110 may be free from all forms of network-based attacks. Other security features desired by the server administrator may also be implemented. The security features to be implemented by the SCIT system are not limited to the six security features discussed above. The six security features discussed above are for exemplary purposes.

By implementing any set of the above discussed security features into the SCIT system, the SCIT architecture might achieve logical isolation of the online servers, the elimination of the dependency on distributed software for cluster coordination, and the removal of the need for intra-server communication.

Figure 4:
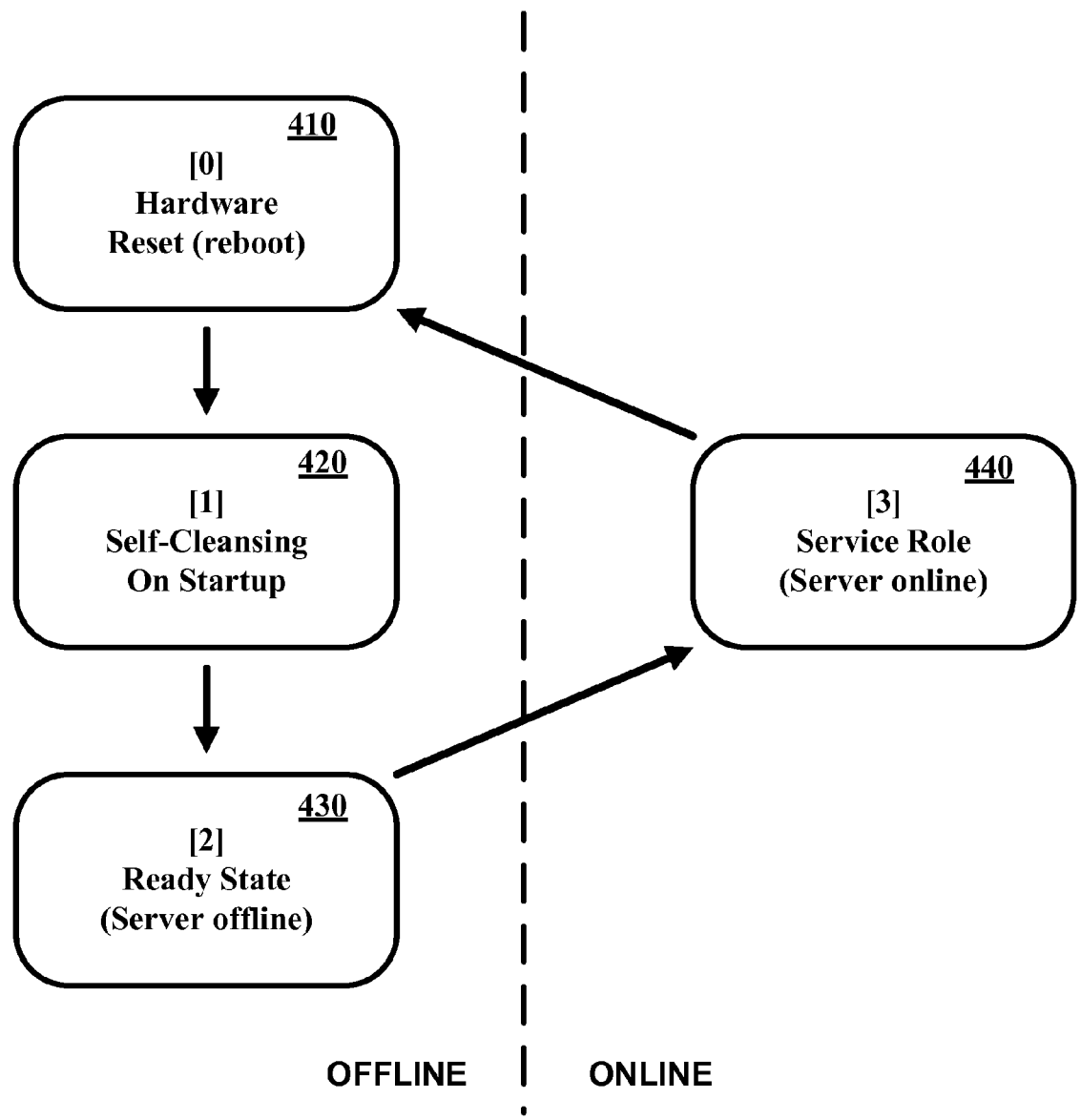
FIG. 4 is a diagram flow of a cleansing operation performed by a server according to an embodiment of the present invention.

The mechanics of SCIT self-cleansing and role rotations are explained here based on FIG. 4, which enumerates various states of the SCIT server 140. A distinction must be made between the terms 'state' and 'role.' In the context of the SCIT system, a state means the condition of the SCIT server 140 at a given point in time whereas the term role refers to what the SCIT server 140 does to provide useful services to the users (i.e., web server, DNS, or file server, etc.).

The SCIT process begins with the warm rebooting (hardware reset) of the server 140 in 410, denoted as state [0] in FIG. 4. The reboot event begins the self-cleansing process in 420 and provides a server whose memory may be "cleaned" to a known uncorrupted state. Upon restarting with clean memory, the server 140 then loads files (might include the critical files or only the critical files) from the trusted (read-only) storage device (or a read/write storage that may be cryptographically-protected source), which is reference state [1]. Critical files, also known generally as "protectee files", include fundamental operating system files (kernel and other vital files), application executables, and important configurations files. However, according to another embodiment of the present invention, the trusted storage device also stores non-critical files, or only non-critical files.

The critical files are the minimum file types that are required to be loaded in a known uncorrupted state in order to provide assured server operation. Other files may be configured to load as protectee files as desired by SCIT system administrators. Once the startup and self-cleansing process is complete in 410 and 420, the server 140 may be said to be in a provably clean state and is ready to be placed into a service role in 430 when directed by the SCIT controller 110. This is the final offline state [2] in the SCIT lifecycle. When commanded by the controller 110 (via the TIM unit), the ready server enters a service role in 440, state [3], during which the server provides service(s) to end users of the SCIT cluster.

Upon completion of its service role, each SCIT server 140 may return to state [0] after a reboot signal. The state [3] to state [0] transition that ensures the server goes through the self-cleansing process may be assured through at least two independent mechanisms, as already discussed above. Under so called normal conditions (no attack on server) the reboot signal may be sent from the controller 110 via the TIM unit 120 and ultimately the SCIT daemon responds to the controller' signal and resets the server 140 to begin the cleansing process. This reset method may rely on the viability of the SCIT daemon, a software process, which may be subject to potential subversion by an attacker.

To eliminate this attack vector and provide assurance that periodic self-cleansing occurs, an independent mechanism known as the Trusted Interface Failsafe Reset Timer 112 may be implemented as a hardware-based timing circuit. AN embodiment of this timer circuit 112 counts down for a specified finite amount of time and upon expiration, triggers a relay which activates the hardware reset switch 145 on the server 140. The timer may be designed in a way so that once counting down to expiration, it cannot be reset by software. The software-based reset mechanism may be backed up by the hardware-based timer such that if corruption of the SCIT daemon should occur the failsafe timer will ensure that the server may be still reset and cleaned. The finite amount of time may be according to one embodiment of the present invention between 1 and 15 minutes.

Within the context of the SCIT server lifecycle, a server may perform one or more service roles in the online state. The controller coordinates and orchestrates the role rotations of the service hosts within a SCIT cluster according to a user-defined scheduling algorithm. One possibility may be a Single Service Role scheme. In a Single Service Role scheme, a clean server may be placed into its service role for a finite amount of time before it is reset and cleaned. The hardware timer described above provides assurance of correct server behavior with respect to going through the reset and cleaning process. Since there may be only a single service role in this scheme, the online portion of the server's lifecycle is tightly bound by the clean state and the timed reset event.

In contrast, there may be the Multiple Service Roles scheme where there are more than one service roles possible during the online portion of the server's lifecycle. The role rotation between the multiple service roles may be governed by the controller signaling through the TIM unit to the SCIT daemon process. Allowing multiple service roles during the online portion of the server's lifecycle should provide flexibility for handling the needs of certain applications. For example, a SCIT-DNS cluster that uses multiple service roles to allow each server to perform first the role of Primary DNS server then finish with the role of Secondary DNS server may be used.

In a notional system where there are two online service roles A and B, the transition from clean to A should be assured. Likewise, the server resetting and cleaning may be achieved. However, the transition from service role A to service role B may not be absolutely guaranteed because this transition relies solely on the correct functioning of the SCIT daemon which is software and is thus subject to attack; there is no independent hardware-based mechanism that can guarantee the transition between multiple service roles. The worst case scenario with this scheme may be the loss of the role rotation control due to SCIT daemon corruption. However, even this situation may be eventually corrected through the hardware-based reset caused by the expiration of the Failsafe Reset Timer.

According to one embodiment of the present invention, periodically resetting and cleansing each SCIT server achieves three features. First, the server begins each lifecycle in a known clean state free from malware or corruption. Second, by placing the finite time limit (the time interval may be any time interval such as in the order of minutes, tens of minutes, seconds, etc.) on the exposure of the server to potential attack via the external network, a probability of a successful attack damaging the SCIT cluster is diminished and an overall impact of an attack is limited. Finally, by rebooting the server and loading protectee files from the trusted source device, any malware or corruption that impacted the server while exposed to the external network should be removed from the server without the need to rely on successful detection of the problems.

The use of specialized hardware according to one embodiment of the present invention provides assurance that the SCIT servers operate in a predictable cycle regardless of any potential attacks on the servers. The hardware interfaces may utilize non-programmable logic circuits which may be assembled with generic components, inexpensive to build, and impervious to network-based attacks, both known and unknown. The hardware interfaces may be off the shelf interfaces known to those skilled in the art.

Two possible applications of the above discussed SCIT system are DNS servers and Web server clusters. However, these servers are illustrative only and not intended to limit the present invention.

An Internet mail service may be collectively supported by a set of protocols that interconnect mail servers and end user machines. Mail servers, or Mail Transfer Agents (MTA), use the Simple Mail Transfer Protocol (SMTP) to exchange emails with remote sites. End user machines, or User Agents, use mail access protocols to interact with the local mail servers. POP3 and IMAP are among the most popular mail access protocols. A mail server assumes the role of an SMTP client when it accepts an incoming SMTP connection from remote sites to receive mails. The server assumes the role of an SMTP server when it establishes an outbound SMTP connection to remote sites in order to deliver emails. While both use the SMTP protocol, these two roles of a mail server have different security vectors.

An SMTP client, or inbound mail server, allows external data to reach the intranet and therefore represents a high security risk. The majority of MTA vulnerabilities are exploited when the server is receiving data. Further, the wide variety of the external data that an inbound mail server must handle, such as: emails in HTML, emails with attachments, email containing scripts, emails using various MINE types, and outright attack scripts, are subject to attack. Compromises in the inbound mail server give worms, viruses and spam emails alike free access to the intranet and turn the server into a stepping stone to attack the intranet. An inbound mail server itself may be infected with network worms, contributing to the propagation of the worm and reducing its capacity in handling emails.

An SMTP server, or outbound mail server, on the other hand represents relatively low security risks. With no need to process emails at all, an SMTP server performs the simple tasks of establishing TCP connections to deliver emails as raw data. This simplicity reduces vulnerabilities and attack paths.

Role separation is a security technique that allows system components with different security vectors to be designed, configured, and maintained differently. Indeed, many Internet service providers already designate separate servers as inbound and outbound mail servers. In implementation, this separation may be enforced by firewall rules. TCP connection requests (SYN packets) originating from the inbound mail server are blocked. TCP connection requests from the public Internet to the outbound mail server are blocked. TCP connection requests from the outbound mail server to the intranet are blocked. POP3/IMAP connections originated from the intranet are allowed to reach the inbound and outbound servers.

This separation may be further enhanced by applying the SCIT security feature: a server that receives and processes external data (e.g., emails) can be assumed compromised and thus be cleansed periodically. According to one embodiment in which a SCIT mail cluster may be implemented, a set of servers rotate through the low-risk role of the outbound mail server, the high-risk roles of the inbound mail servers, and cleansing mode. The aforementioned SCIT controller architecture may be used to coordinate rotations and handle intra-cluster communications. The use of a controller that keeps track of cluster-wide state allows for discrimination in SCIT management. For instance, short life cycles are implemented for the high risk, inbound mail servers and relatively long cleansing cycles are implemented for the outbound servers. Different system auditing and cleansing procedures may be followed by servers retiring from different roles. Servers assuming different roles may be booted into different operating systems and/or running different MTA implementations. Differentiated configurations may present the best chance to optimize performance and maximize security.

The above discussed embodiments may be implemented by using a processor that executes commands stored in a processor program product and one of ordinary skill in the art would appreciate that any known processor or computer may execute the methods of the embodiments discussed above. In addition, a computer system or processor system may be used to implement the methods of the embodiments discussed above.

Figure 5:
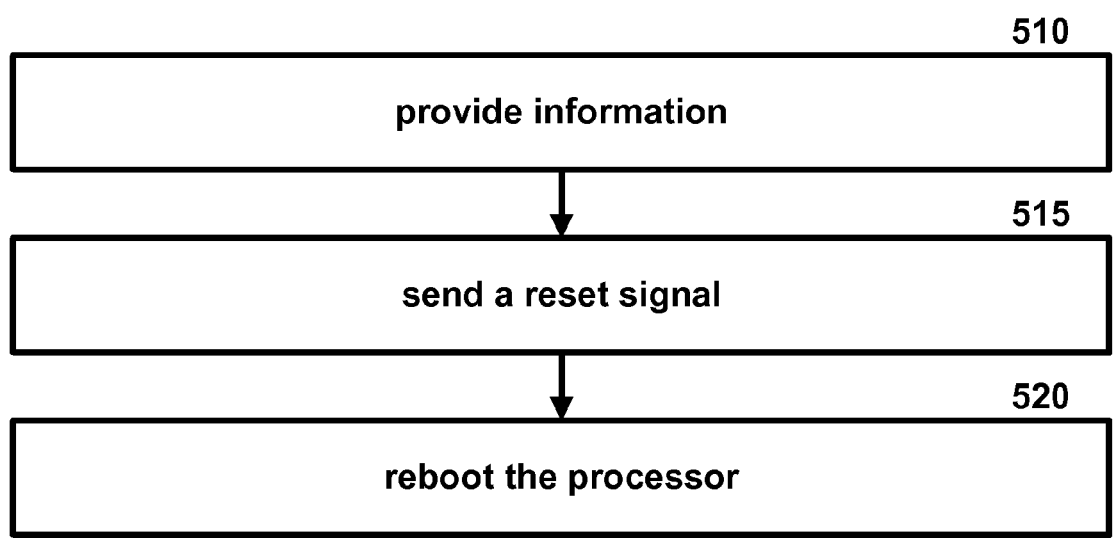
FIG. 5 is a diagram flow illustrative of controlling a server according to an embodiment of the present invention.

With regard to FIG. 5, a method according to one embodiment of the present invention is presented. In 510, information may be provided to the network by the processing unit via plural communication channels. In 515, a reset signal may be sent from the controller to the reset unit of the processing unit (shown for example in the embodiment of FIG. 3) after a specified amount of time. As discussed above, the specified amount of time may be in the range from a few seconds to minutes. However, one skilled in the art will recognize that the specified amount of time may depend upon factors such as hardware operation speeds, reboot and software load times balanced against the propagation time of malicious agents. As systems progress, it is possible that the specified amount of time may also need to change. Alternatively, instead of counting a specified amount of time, another condition may be used to reset the processing unit. For example, the specified condition might be the identification of an attack on the processing unit. In 520, the reset unit, which is connected only to a communication channel of the controller and is isolated from the plural communication channels, reboots the processor unit when the reset signal is received by the reset unit.

Figure 6:
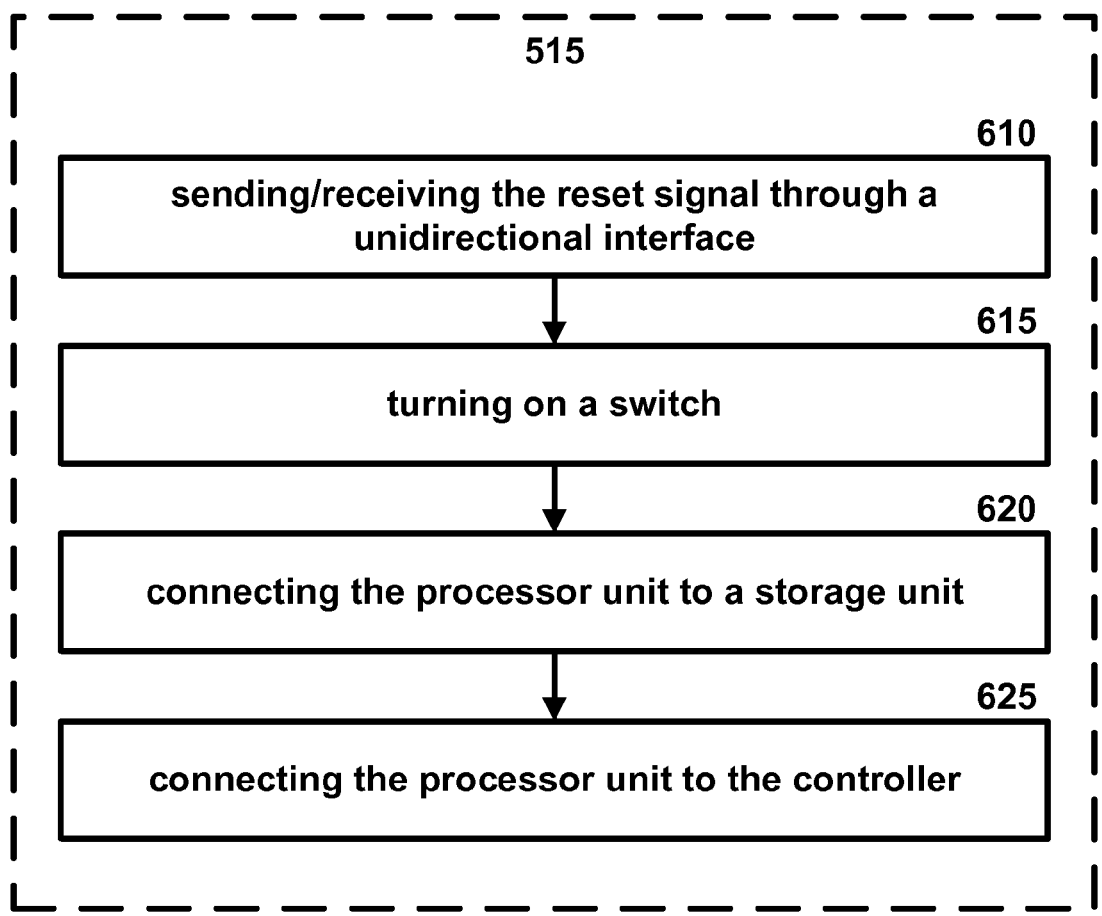
FIG. 6 is a diagram flow illustrative of controlling the server according to an aspect of an embodiment of FIG. 5.
Figure 7:
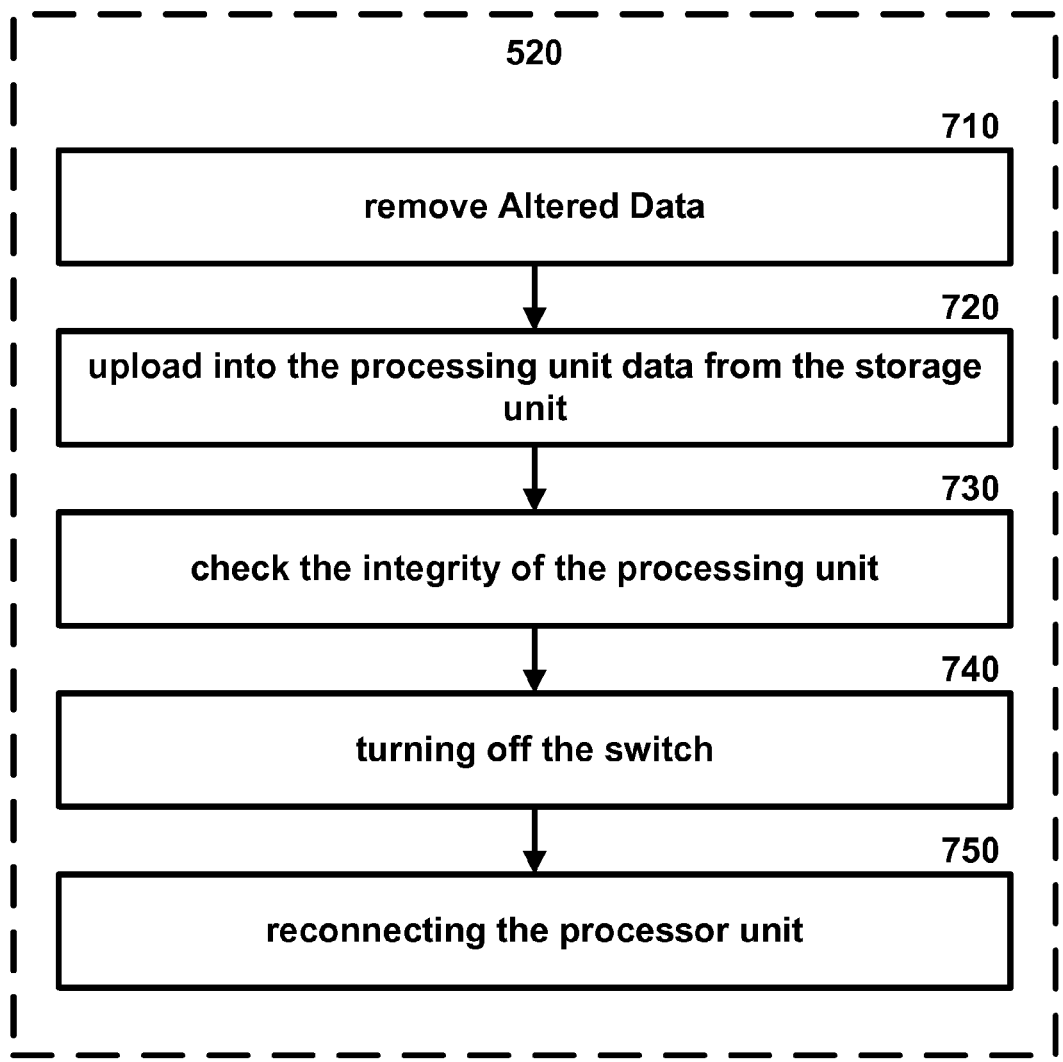
FIG. 7 is a diagram flow illustrative of controlling the server according to an aspect of an embodiment of FIG. 5.

Optionally, further processes as shown in FIGS. 6 and 7 may be executed. For example, the 515 may include, as shown in FIG. 6, a process 610 in which the reset signal is sent through the first unidirectional interface located at the controller and the second unidirectional interface located at the processor unit. In 615, the switch is turned on and the processor unit interrupts the plural communication channels between the processor unit and the network. In 620, the processor unit may be connected to the storage unit via a bidirectional path only when the switch is turned on. In 625, the processor unit may be connected to the controller via a bidirectional path that does not include the first and second unidirectional interfaces, only when the switch is turned on.

In addition, the 520 may include, as shown in FIG. 7, a 710 that removes altered data of the processing unit based on information exchanged along the bidirectional path between the controller and the processing unit. In 720, data from the storage unit may be uploaded into the processing unit to replace the removed altered data. In 730, the integrity of the processing unit may be checked based on backup data stored in the storage unit. In 740, the switch may be turned off to disconnect the processing unit from the bidirectional path connecting the processing unit to the controller, and the storage unit. In 750, the processor unit may be reconnected to the network.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above described exemplary embodiments.

In addition, it should be understood that any figures, tables, and examples which highlight the functionality and advantages of the present invention, are presented for example purposes only. The architecture of the present invention is sufficiently flexible and configurable, such that it may be utilized in ways other than that shown. For example, the act indicated in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

Furthermore, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A method for self-cleansing a server processing unit connected to a network, comprising, iteratively, without the need to rely on successful detection of a problem:
   providing information to the network by the server processing unit via plural communication channels;
   sending a reset signal through a first unidirectional interface located at a controller and a second unidirectional interface located at the server processor unit to a reset unit of the server processing unit after a specified amount of time, the first unidirectional interface including a first non-programmable hardware enforced security component, the second unidirectional interface including a second non-programmable hardware enforced security component, the reset unit being connected only to a unidirectional communication channel of the controller and being isolated from the plural communication channels;
   turning on a switch that causes the server processor unit to interrupt the plural communication channels between the server processor unit and the network;
   connecting the server processor unit to a storage unit via a bidirectional path only when the switch is turned on; and
   rebooting the server processor unit when the reset signal is received by the reset unit.

2. The method according to claim 1, wherein the sending further comprises:
   connecting the server processor unit to the controller via a bidirectional path that does not include the first and second unidirectional interfaces only when the switch is turned on.

3. The method according to claim 2, wherein the rebooting comprises:
   removing altered data of the server processing unit based on information exchanged along the bidirectional path between the controller and the server processing unit.

4. The method according to claim 3, wherein the rebooting further comprises:
   uploading into the server processing unit data from the storage unit to replace the removed altered data.

5. The method according to claim 4, wherein the rebooting further comprises:
   checking the integrity of the server processing unit based on backup data stored in the storage unit.

6. The method according to claim 5, wherein the rebooting further comprises:
   turning off the switch to disconnect the server processing unit from the bidirectional path connecting the server processing unit to the controller and the storage unit.

7. The method according to claim 6, wherein the rebooting further comprises:
   reconnecting the server processor unit to the network.

8. The method according to claim 1, further comprising:
   sending the reset signal to a plurality of server processor units.

9. A data alteration preventing, self-cleansing system, comprising:
   a server processor unit configured to provide information to a network via plural communication channels;
   a reset unit configured to reboot the server processor unit based on a reset signal, the reset unit being non-programmable hardware;
   a controller configured to provide the reset signal to the reset unit after a specified amount of time, the reset unit being connected only to a unidirectional communication channel of the controller and being isolated from the plural communication channels , wherein the system iteratively, without the need to rely on successful detection of a problem, provides the information, reboots the server processor unit, and provides the reset signal;
   a first and second unidirectional interfaces configured to transmit the reset signal from the controller to the reset unit, the first unidirectional interface being located in the controller and the second unidirectional interface being located in the server processing unit, the first and second unidirectional interfaces being respectively first and second hardware enforced security components;
   a switch configured to turn off the plural communication channels between the server processor unit and the network and to turn on a bidirectional communication path between the server processor unit and the controller; and
   a storage unit configured to supply backup data to the server processor unit when the switch turns on a bidirectional communication path between the storage unit and the server processor unit.

10. The system according to claim 9, further comprising:
    at least one additional server processor unit connected to the controller.

11. The system according to claim 10, further comprising:
    at least one additional pair of unidirectional interfaces associated with the at least one additional server processor unit, wherein the unidirectional interfaces are hardware enforced components.

12. A data alteration preventing, self-cleansing system, comprising:
    a plurality of server processor units, each processor unit configured to provide information to network via plural communication channels;
    a plurality of reset units, each reset unit configured to reboot a corresponding server processor unit based on a corresponding reset signal, each reset unit being non-programmable hardware;

a controller configured to provide a plurality of reset signals to the plurality of reset units after a corresponding specified amount of time, each reset unit being connected only to a corresponding unidirectional communication channel of the controller and being isolated from the corresponding plural communication channels;

a plurality of first and second unidirectional interfaces configured to transmit the reset signals from the controller to the plurality of reset units, the plurality of first unidirectional interfaces being located in the controller and the plurality of second unidirectional interfaces being located in the plurality of server processing units, wherein the first and second unidirectional interfaces are respectively first and second hardware enforced security components;

a plurality of switches, each switch being configured to turn off the corresponding plural communication channels between the server processor unit and the corresponding network and to turn on a corresponding bidirectional communication path between the corresponding server processor unit and the controller; and a plurality of storage units, each storage unit being configured to supply backup data to the corresponding server processor unit when the corresponding switch turns on a corresponding bidirectional communication path between the corresponding storage unit and the corresponding server processor unit; and wherein the system iteratively, without the need to rely on successful detection of a problem, provides the information, reboots, provides the reset signals, transmits the reset signals, turns off the corresponding plural communication channels, and supplies backup data.

* * * * *